United States Patent
Horvath et al.

(10) Patent No.: US 6,814,183 B2
(45) Date of Patent: Nov. 9, 2004

(54) EXTENSIBLE EVACUATION SLIDE

(75) Inventors: William J. Horvath, Chandler, AZ (US); Daniel B. Wilson, Glendale, AZ (US); Paul Zonneveld, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/273,868

(22) Filed: Oct. 17, 2002

(65) Prior Publication Data

US 2004/0074696 A1 Apr. 22, 2004

(51) Int. Cl.[7] .......................... A62B 1/20; B65G 11/10
(52) U.S. Cl. .................. 182/48; 193/25 B; 244/905
(58) Field of Search .................. 182/48; 244/137.2, 244/905; 193/25 B

(56) References Cited

U.S. PATENT DOCUMENTS

| 2,936,056 | A | | 5/1960 | Heyniger et al. |
| 3,463,266 | A | | 8/1969 | Day et al. |
| 3,554,344 | A | | 1/1971 | Summer et al. |
| 4,846,422 | A | * | 7/1989 | Fisher ...................... 244/137.2 |
| 5,906,340 | A | * | 5/1999 | Duggal ........................ 182/48 |
| 6,298,970 | B1 | * | 10/2001 | Targiroff et al. .......... 193/25 B |
| 6,454,220 | B1 | * | 9/2002 | Oney ........................... 182/48 |

* cited by examiner

Primary Examiner—Hugh B. Thompson, II
(74) Attorney, Agent, or Firm—Jerry Holden; John Titus

(57) ABSTRACT

An inflatable evacuation slide system (10) is selectively deployable in either a foreshortened or lengthened configuration. The foot end (50) of the escape slide (12) includes a compartment (92) containing an extensible slide portion (70) stored in an undeployed condition. The compartment is sealed by means of conventional speed lacing (92) held together by a single master loop (96). A pyrotechnic cable cutter (98) is attached to the master loop (96) to severe it at the appropriate time thereby releasing the extensible portion of the slide. A control circuit (100) determines whether to deploy the extensible portion based on input from a non-contacting electronic sensor (110) such as an inclinometer.

11 Claims, 3 Drawing Sheets

EXTENSIBLE EVACUATION SLIDE

BACKGROUND OF THE INVENTION

This invention relates to emergency evacuation equipment for aircraft, in particular, to inflatable aircraft evacuation slides.

The requirement for reliably evacuating airline passengers in the event of an emergency is well known. Emergencies at take-off and landing often demands swift removal of the passengers from the aircraft because of the potential of injuries from fire, explosion, or sinking in water. A conventional method of quickly evacuating a large number of passengers from an aircraft is to provide multiple emergency exits, each of which is equipped with an inflatable evacuation slide. These inflatable slides are normally stored in an uninflated condition in a container or packboard requiring a minimum of space in the interior of the aircraft and are typically either mounted on the interior of the aircraft door or immediately adjacent thereto. Opening of the aircraft emergency evacuation exit initiates the inflation of the emergency evacuation slide. The slide is rapidly inflated and ready for evacuation of passengers who in a very short period of time following opening of the exit. The descent of evacuees on an inflatable evacuation slide is primarily governed by the angle formed between the slide surface and the ground. The optimum rate is usually achieved when the angle they are between is from about 30° at a minimum to about 50° at a maximum. The lower the angle, the slower the rate of descent and the evacuation may not proceed with sufficient dispatch. If the angle is much greater than 50°, the slide surface may be too precipitous and evacuees may balk at descending the slide and/or may be injured upon impact with the ground.

Controlling the proper angle between the slide and ground is made more complex since the evacuation slides are normally utilized only in emergency situations. In such situations it may be that one or more of the landing gear of the aircraft have been damaged or collapsed such that the aircraft itself may be canted at a number of different possible angles. For example, if the nose landing gear collapses, the nose of the aircraft will drop and the fuselage will pivot about the main landing gear so that an escape exit located at the tail of the plane may be elevated substantially. An escape slide that is disposed at the proper angle for rapid but safe evacuation at a normal height would become too steep for safe evacuation from the elevated exits. Similarly, an escape slide that is disposed near the nose of the aircraft may be deployed at too shallow an angle for rapid evacuation.

Use of variable length evacuation slides has been suggested as a means to accommodate evacuation of passengers from an evacuation exit that may be elevated or depressed relative to the ground. U.S. Pat. No. 2,936,056 to Heyniger discloses an inflatable evacuation slide having an extensible portion held within a compartment closed by a zipper. If the evacuation slide is to be deployed in the long configuration, prior to inflation the zipper must be manually removed. Accordingly, whether to deploy the evacuation slide in the long configuration requires a manual act predicated on human judgement at a time of possible emotional stress.

U.S. Pat. No. 3,463,266 to Day discloses an extensible escape slide having inflatable side beams that are normally foreshortened in length but which may be extended when additional length is required. The determination as to whether to deploy the slide in the foreshortened or lengthened condition is made by dropping a weight attached to a predetermined length of cord. If the weight touches the ground, an electrical connection remains open and the extensible side beams are restrained in their foreshortened condition. If, however, the weight does not touch the ground, the weight closes a switch that releases a restraint allowing the side beams to deploy to their fullest extent.

Similarly, U.S. Pat. No. 3,544,344 to Summer, et al. discloses a variable length inflatable slide comprising a height sensing means consisting of a weight attached to a predetermined length of cable. Upon initiation of the evacuation slide, the weight is dropped. If the weight contacts the ground the cable is not activated to release the extensible portion and the slide deploys in its foreshortened condition. If, however, the mass does not contact the ground the weight draws a cone through a sleeve which locks the cable in a fixed position. As the slide deploys, the cable in its locked position releases the extensible portion under the force of the inflating slide.

As noted hereinbefore, evacuation slides having a manually deployed extension require human judgement at a time of possible emotional stress and therefore may be improperly deployed. Consequently these slides may be unreliable in service. Similarly, extensible escape slides that rely on the dropping of a plumb line to measure the distance from the slide to the ground are cumbersome and, because the weight and line may become fouled upon deployment, these designs also suffer from potential reliability problems. Accordingly, what is needed is an extensible emergency evacuation slide that does not rely on manual actuation or physical measurement of the distance to the ground to determine whether the slide is to be deployed in the foreshortened or extended configuration.

SUMMARY OF THE INVENTION

The present invention comprises an inflatable evacuation slide system including an evacuation slide that is selectively deployable in either a foreshortened or lengthened configuration based on the input from an electronic sensor. In an illustrative embodiment, the slide comprises a pair of main support tubes supporting a flexible slide surface. The foot end of the escape slide includes a compartment containing an extensible slide portion stored in an undeployed condition. The compartment is sealed by means of conventional speed lacing held together by a single master loop. A pyrotechnic cable cutter is attached to the master loop to sever it at the appropriate time, thereby releasing the extensible portion of the slide.

A control circuit determines whether to deploy the extensible portion based on input from a non-contacting electronic sensor such as an inclinometer. As noted hereinbefore, the principal reason for an egress opening to be elevated or depressed from its normal height during an emergency evacuation is that one or more of the aircraft landing gear has collapsed. The detection of a collapsed landing gear is translated to a deviation of the aircraft fuselage from its normal horizontal attitude into a nose down, tail down, port or starboard wing down attitude. Since the nose down, tail down, port or starboard wing down attitude can be detected electronically as a pitch and/or roll angle, a simple logic circuit can deploy each of the nose, over-wing and/or tail evacuation slides in the appropriate configuration reliably and without the use of cumbersome direct measurement techniques such as the dropping of a weight attached to a cable.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
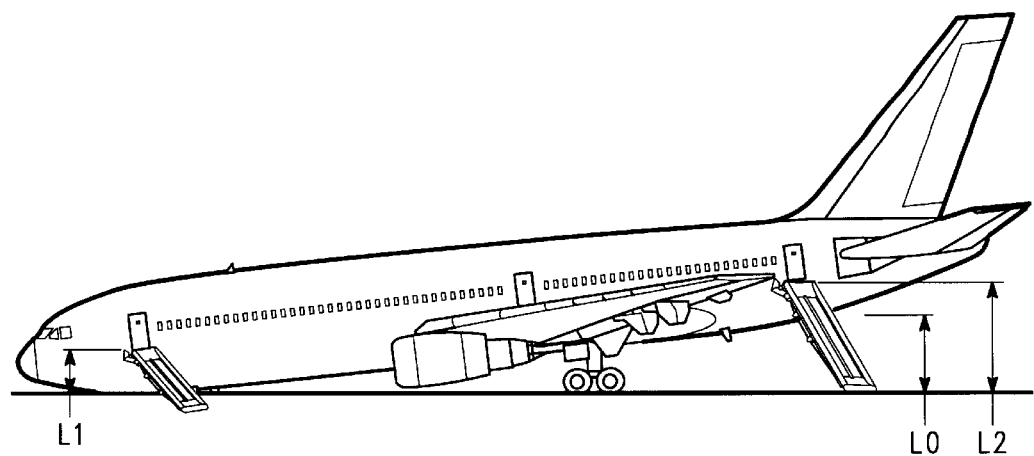
FIG. 1 is a side elevational view of an aircraft equipped with prior art evacuation slides having landed in a nose-down attitude.

The drawing figures are intended to illustrate the general matter of construction and are not necessarily to scale. In the detailed description and the drawing figures, specific illustrative examples are shown and herein described in detail. It should be understood, however, that the drawing figures and detailed description are not intended to limit the invention to the particular form disclosed but are merely illustrative and intended to teach one of ordinary skill how to make and/or use the invention claimed herein and for setting forth the best mode for carrying out the invention.

As noted hereinbefore, the descent of evacuees on an inflatable evacuation slide is primarily governed by the angle formed between the slide surface and the ground. For optimum egress, the evacuation slide must be deployed within a certain range of angles. If the angle is too low, the evacuees will not descend the slide with sufficient speed. If the angle is too steep, the slide surface may be too precipitous and evacuees may balk at descending the slide and/or may be injured upon impact with the ground. Controlling the proper angle between the slide and ground is made more complex since the evacuation slides are normally utilized only in an emergency situation in which the aircraft may not be in its normal horizontal attitude. For example, as shown in FIG. 1 if the nose landing gear collapses after an emergency landing, the nose of the aircraft will drop and the fuselage will pivot about the main landing gear so that an escape slide located at the nose of the plane will be at a distance L1. This distance is substantially less than L0, the distance from the threshold of the emergency exit door to the ground when the plane is in a normal horizontal attitude. Similarly, the tail of the plane is elevated to a level L2 that is substantially greater than L0. As such, a prior art evacuation slide of fixed dimensions will be deployed at too shallow an angle at the nose of the aircraft and too precipitous an angle at the tail of the aircraft.

Figure 2:
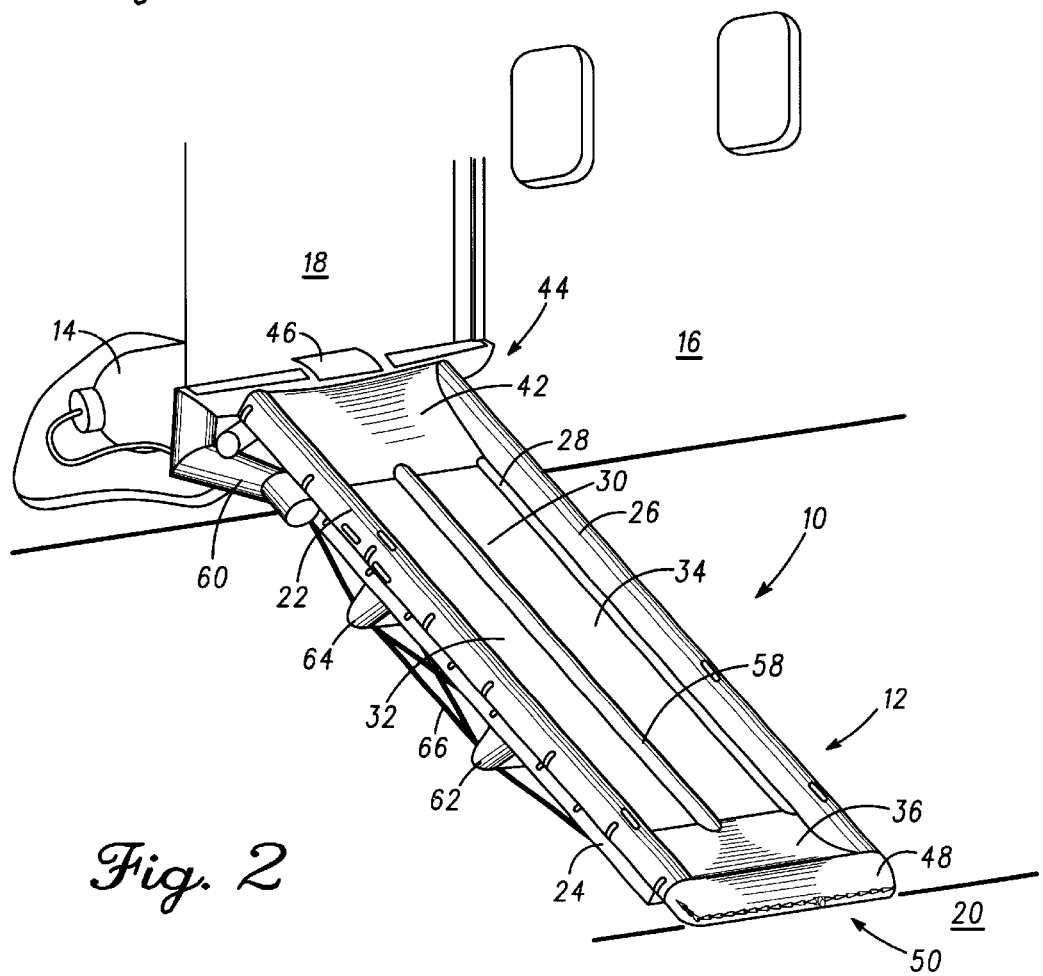
FIG. 2 is a perspective view of an inflatable escape slide system incorporating features of the present invention deployed in a foreshortened condition.
Figure 3:
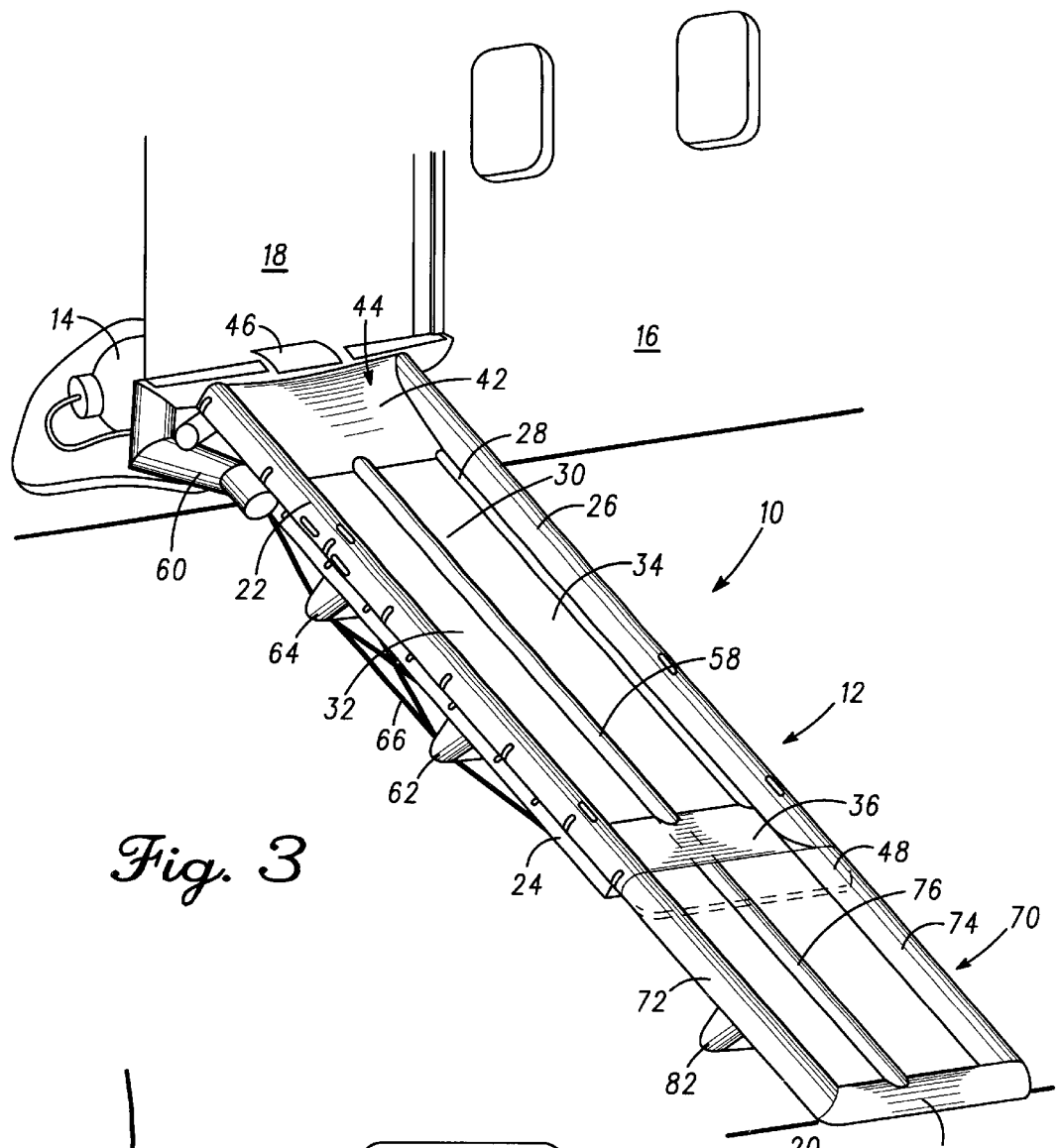
FIG. 3 is a perspective view of an inflatable escape slide system incorporating features of the present invention deployed in an extended configuration.

With reference to FIGS. 2 and 3, an extensible evacuation slide system 10 incorporating features of the present invention includes an inflatable evacuation slide 12 and an inflator 14, which may be a conventional pyrotechnic, compressed gas, or hybrid inflator well-known in the art. Extensible evacuation slide system 10 is stored in an undeployed condition in a packboard housing inside the fuselage of aircraft 16. In a deployed condition, inflatable evacuation slide 12 extends outward from a location proximal the egress opening 18 of aircraft 16 and extends downward to ground level 20 or other lower supporting surface.

Inflatable evacuation slide 12 comprises upper main support tubes 22 and 26 and lower main support tubes 24 and 28 supporting a flexible slide surface 30. Flexible sliding surface 30 is composed of a left main panel 32, a right main panel 34, a foot end panel 36 and a head end panel 42. The head end 44 of extensible evacuation slide 12 is secured to aircraft 16 by a conventional girt 46. Upper main support tubes 22 and 26 are maintained in a spaced-apart configuration by an upper toe end transverse tube 48 located at the foot end 50 of extensible evacuation slide 12 and an upper head end transverse tube (not shown) located at head end 44 of extensible evacuation slide 12. Lower main support tubes 24 and 28 are similarly maintained in a spaced-apart configuration by transverse tubes (also not shown). A center support tube 58 bisects flexible sliding surface 30 to create two substantially parallel sides. A lateral support tube 60 provides additional support for head end 44 of extensible evacuation slide 12.

Additional support to prevent extensible evacuation slide 12 from buckling under heavy load is provided by a lower truss tube 62 and an upper truss tube 64 each of which comprises a U-shaped tube extending from lower main support tube 24 to lower main support tube 28. Optionally, lower truss tube 62 and upper truss tube 64 comprise E-shaped tubes interconnecting lower main support tube 24, lower main support tube 28 and center support tube 58. A plurality of truss straps 66 act as tension members to support extensible evacuation slide 12 against buckling under heavy load.

With particular reference to FIG. 3, extensible evacuation slide 12 includes an extensible portion 70 comprising main support tube extensions 72 and 74, center support tube extension 76, and slide surface extension 78. Main support tube extensions 72 and 74 are maintained in a spaced-apart configuration by extension transverse tube 80 and additional resistance to buckling is provided by extension truss tube 82.

Figure 4:
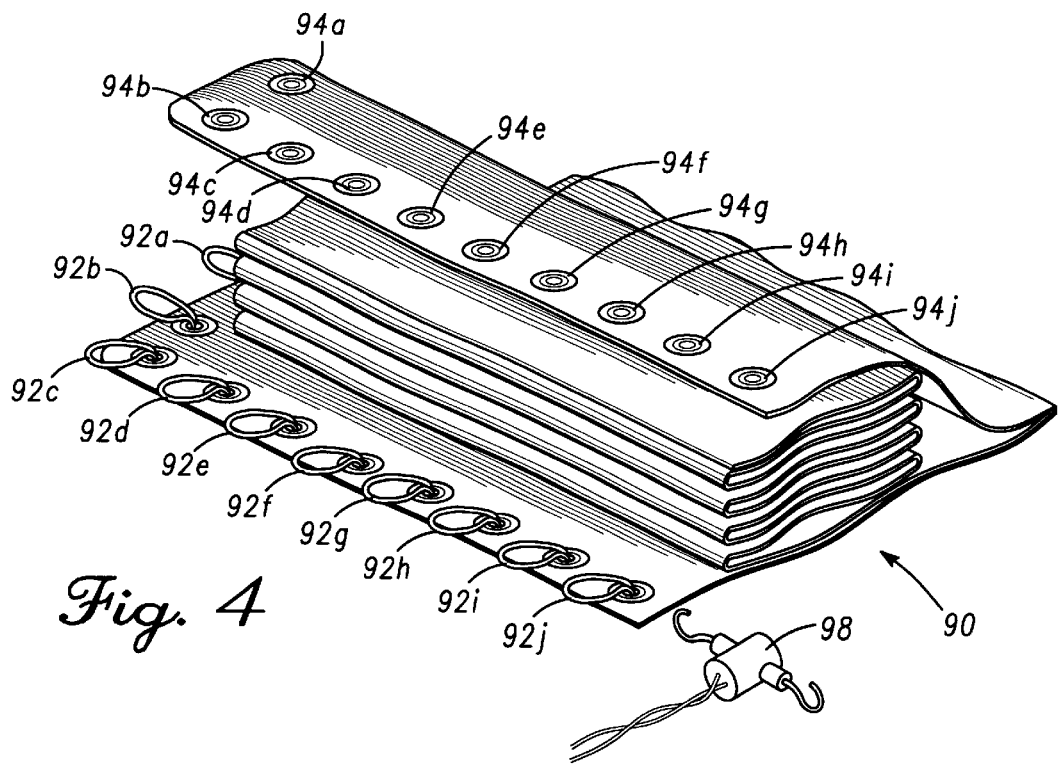
FIG. 4 is a partial perspective cutaway view of the toe portion of the escape slide of FIG. 2 showing details of the extensible portion.
Figure 5:
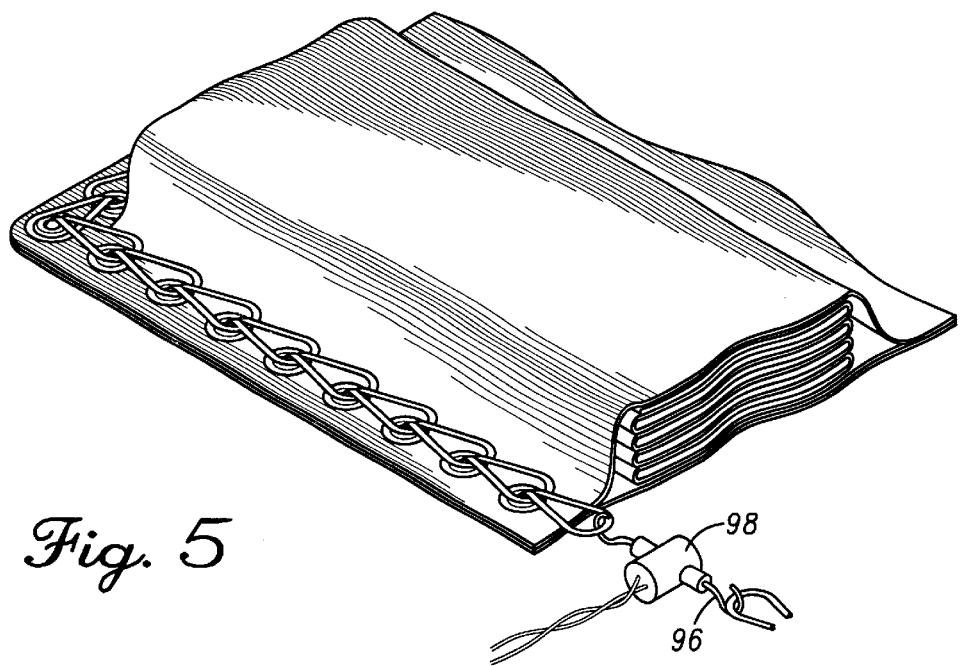
FIG. 5 is a is a partial perspective cutaway view of the toe portion of the escape slide of FIG. 2 showing details of the extensible portion.

With reference to FIGS. 4 and 5, the inflatable tubular members of extensible portion 70 are pneumatically interconnected with upper main support tubes 22 and 26 so that they are pressurized when the remainder of extensible evacuation slide 12 is inflated. Extensible portion 70 is prevented from deploying, however, because it is retained in a pouch 90 adjacent upper toe end transverse tube 48 at the foot end 50 of evacuation slide 12. As shown in FIGS. 4 and 5, pouch 90 is maintained in a closed configuration by means of a series of loops 92a–j, fed through a series of grommets 94a–j with each loop passed through the preceding loop to form what is conventionally referred to as "speed lacing." The speed lacing is held together at the center by means of a master loop 96. Attached to master loop 96 is a cord cutter 98 comprising a pyrotechnically driven knife edge discussed more fully hereinafter. As can be determined from inspection of FIG. 5, once master loop 96 is severed by cord cutter 98 each of loops 92a–j are released permitting extensible portion 70 to deploy.

Figure 6:
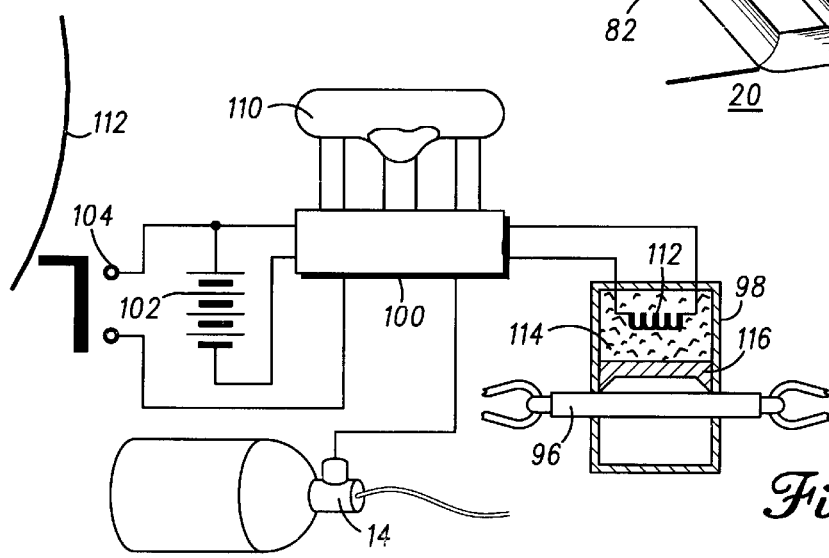
FIG. 6 is a schematic diagram of an electronic control circuit for deploying the inflatable escape slide.

With reference to FIG. 6, control circuit 100 comprises a logic circuit together with a conventional firing circuit for initiating the inflation of an inflatable evacuation slide. Interconnected with logic circuit 100 are a power source 102, switch 104 and an electronic sensor 110. The electronic sensor 110 comprises a conventional solid state inclinometer, mercury switch or other sensor that may be positioned within an aircraft to sense pitch and/or roll of the aircraft. In operation, if emergency exit door 112 is opened in the armed position, switch 104 closes and sends a signal to electronic control circuit 100. In response to the signal from switch 104, electronic control circuit 100 initiates inflator 14 which begins the inflation of extensible evacuation slide 12. Contemporaneously, electronic control circuit 100 interrogates electronic sensor 110 to determine whether the aircraft is in a horizontal attitude, a nose down attitude or some other attitude. In response to the signal from electronic sensor 110, electronic control circuit 100 deploys extensible evacuation slide 12 in either the foreshortened or lengthened configuration. If extensible evacuation slide 12 is to be deployed in the extended configuration, a firing circuit within electronic control circuit 100 initiates squib 112 of cord cutter 98 which, in turn, initiates a pyrotechnic composition 114. Pyrotechnic composition 114 burns rapidly and the expanding gas drives knife edge 116 through master loop 96 severing it. This permits the speed lacing formed of loops 92a–j to unravel thereby releasing extensible portion 70 to deploy. If extensible evacuation slide 12 is to be deployed in the foreshortened configuration, cord cutter 98 is not initiated and therefore master loop 96 remains intact preventing deployment of extensible portion 70.

As can be determined from the foregoing, use of an electronic sensor, such as an inclinometer as the environmental sensor to determine whether to deploy extensible evacuation slide in the foreshortened or lengthened configuration provides for an extremely reliable and compact system as compared with prior art systems which rely on mechanical measurements such as the dropping of a weight attached to a fixed length of cord. Although certain illustrative embodiments and methods have been disclosed herein, it will be apparent from the foregoing disclosure to those skilled in the art that variations and modifications of such embodiments and methods may be made without departing from the spirit and scope of the invention. For example, the inclinometer may be replaced with other non-contacting electronic sensors such as an infrared or ultrasonic rangefinder. Accordingly, it is intended that the invention shall be limited only the extent required by the appended claims and the rules and principals of applicable law.

What is claimed is:

1. An inflatable escape slide system comprising:
an inflatable escape slide adapted to extend in a deployed condition from an elevated supporting surface to a lower supporting surface, said inflatable escape slide comprising a plurality of inflatable tubular members, which in a deployed condition, support a slide surface extending in a longitudinal direction from a head end proximal said elevated supporting surface to a foot end supported by said lower supporting surface, said inflatable escape slide being deployable in a first configuration in which said inflatable escape slide has a first predetermined length and a second configuration in which said inflatable escape slide has a second predetermined length that is longer than said first predetermined length;
an inflator for providing a source of pressurized gas for inflating said plurality of inflatable tubular members;
a sensor comprising an inclinometer having a sensor output, said sensor output comprising a signal indicative of the distance from said elevated supporting surface to said lower supporting surface
an electronic control circuit having an input that receives said sensor output and having a control output that, in a first state, deploys said inflatable escape slide in said first configuration and, in a second state, deploys said inflatable escape slide in said second configuration.

2. The inflatable escape slide system of claim 1, further comprising:
an electrically initiated actuator, said electrically initiated actuator responsive to said control output from said electronic control circuit for deploying said inflatable escape slide in one of said first and second configurations.

3. The inflatable escape slide system of claim 2, wherein:
said electrically initiated actuator comprises a pyrotechnic actuator.

4. The inflatable escape slide system of claim 1 further comprising:
an extensible portion, said extensible portion comprising an inflatable slide surface stored in an undeployed condition in a compartment proximal said foot end of said inflatable escape slide, said compartment having an opening sealed by a length of speed lacing secured by a master loop; and
a pyrotechnic actuator responsive to said control output of said control circuit for severing said master loop thereby permitting said speed lacing to unlace permitting said extensible portion to be deployed from said compartment.

5. An inflatable escape slide system comprising:
an inflatable escape slide adapted to extend in a deployed condition from an elevated supporting surface to a lower supporting surface, said inflatable escape slide comprising a plurality of inflatable tubular members, which in a deployed condition support a slide surface extending in a longitudinal direction from a head end proximal said elevated supporting surface to a foot end supported by said lower supporting surface, said inflatable escape slide having an extensible portion, said extensible portion being moveable from a stowed position to a deployed position for increasing a longitudinal dimension of said inflatable escape slide;
an inflator for providing a source of pressurized gas for inflating said plurality of inflatable tubular members;
a non-contacting sensor having a sensor output, said sensor output comprising a signal indicative of the distance from said elevated supporting surface to said lower supporting surface and;
a control circuit responsive to said non-contacting sensor for deploying said retractable portion;
a compartment proximal said foot end of said inflatable escape slide; said compartment having an interior volume for storing said extensible portion in an undeployed condition, said compartment further comprising an opening to said interior volume sealed by a length of speed lacing secured by a master loop; and
a pyrotechnic actuator responsive to an output of said control circuit for severing said master loop thereby permitting said speed lacing to unlace permitting said extensible portion to be deployed from said compartment.

6. The inflatable escape slide system of claim 5, wherein:
said non-contacting sensor comprises an inclinometer.

7. An inflatable escape slide system for providing egress from an aircraft comprising:
an inflatable escape slide adapted to extend in a deployed condition from an egress opening of said aircraft to a lower supporting surface, said inflatable escape slide comprising a plurality of inflatable tubular members, which in a deployed condition support a slide surface extending in a longitudinal direction from a head end proximal said egress opening of said aircraft to a foot end supported by a lower supporting surface, said inflatable escape slide being deployable in a first configuration in which said inflatable escape slide has a first predetermined length and a second configuration in which said inflatable escape slide has a second predetermined length that is longer than said first predetermined length;

an inflator for providing a source of pressurized gas for inflating said plurality of inflatable tubular members;

a sensor comprising an inclinometer having a sensor output, said sensor output comprising a signal indicative of the attitude of said aircraft;

an electronic control circuit having an input that receives said sensor output and having a control output which, in a first state deploys said inflatable escape slide in said first configuration and in a second state deploys said inflatable escape slide in said second configuration.

8. The inflatable escape slide system of claim 7, further comprising:

an electrically initiated actuator, said electrically initiated actuator responsive to said control output from said electronic control circuit for deploying said inflatable escape slide in one of said first and second configurations.

9. The inflatable escape slide system of claim 8, wherein:

said electrically initiated actuator comprises a pyrotechnic actuator.

10. The inflatable escape slide system of claim 7, further comprising:

an extensible portion, said extensible portion comprising an inflatable slide surface stored in an undeployed condition in a compartment proximal said foot end of said inflatable escape slide, said compartment having an opening sealed by a length of speed lacing secured by a master loop; and a pyrotechnic actuator responsive to said control output of said control circuit for severing said master loop thereby permitting said speed lacing to unlace permitting said extensible portion to be deployed from said compartment.

11. An inflation control system adapted to deploy an inflatable escape slide from an elevated supporting surface to a lower supporting surface, said inflatable escape slide having an extensible portion, said inflation control system comprising:

an inflator for providing a source of pressurized gas for inflating said inflatable escape slide;

means responsive to the opening of an emergency evacuation exit for activating said inflator for inflating said inflatable escape slide;

a height sensor comprising an electronic sensor having a sensor output indicative of a distance from said escape slide to said horizontal supporting surface;

an actuator responsive to a firing signal for deploying said extensible portion of said inflatable escape slide; and a control circuit having an input for receiving said sensor output and an output for providing a firing signal to said actuator for deploying said extensible portion of said inflatable escape slide, wherein said actuator comprises a pyrotechnic actuator adapted to sever a length of cable to release said extensible portion of said inflatable escape slide.

* * * * *